United States Patent [19]

Göransson

[11] 4,007,809
[45] Feb. 15, 1977

[54] SYSTEM FOR HANDLING GOODS IN SELFSERVICE SHOPS

[75] Inventor: Pehr-Gunnar Heine Göransson, Malmo, Sweden

[73] Assignee: Bag System AB, Sweden

[22] Filed: Aug. 27, 1975

[21] Appl. No.: 608,180

[52] U.S. Cl. .................. 186/1 AC; 280/33.99 F; 280/33.99 H; 280/DIG. 4
[51] Int. Cl.² ........................... A47F 10/00
[58] Field of Search .............. 186/1 A, 1 AC; 214/44 R, 58, 83, 18; 280/33.99 F, 33.99 H, DIG. 4

[56] References Cited

UNITED STATES PATENTS

| | | | |
|---|---|---|---|
| 3,140,758 | 7/1964 | Berg | 280/33.99 F |
| 3,437,176 | 4/1969 | Ruttenberg et al. | 280/33.99 F X |
| 3,446,315 | 5/1969 | Close | 186/1 AC |

FOREIGN PATENTS OR APPLICATIONS 789,376   7/1968   Canada .................. 186/1 AC

*Primary Examiner*—Stephen G. Kunin
*Attorney, Agent, or Firm*—Eugene E. Geoffrey, Jr.

[57] ABSTRACT

A system for handling goods in selfservice shops, comprising a shopping trolley and a cash counter. The trolley comprises at least one basket consisting of a bottom and four side walls, one of which is pivotally connected to two opposite side walls of the basket and adapted to pivot from a lowered closed position to a raised open position. The cash counter includes a compartment corresponding to the size of the trolley and designed to receive the trolley, and control members co-operating with the trolley to move the pivoting side wall from lowered to raised position as the trolley is introduced into said compartment.

4 Claims, 3 Drawing Figures

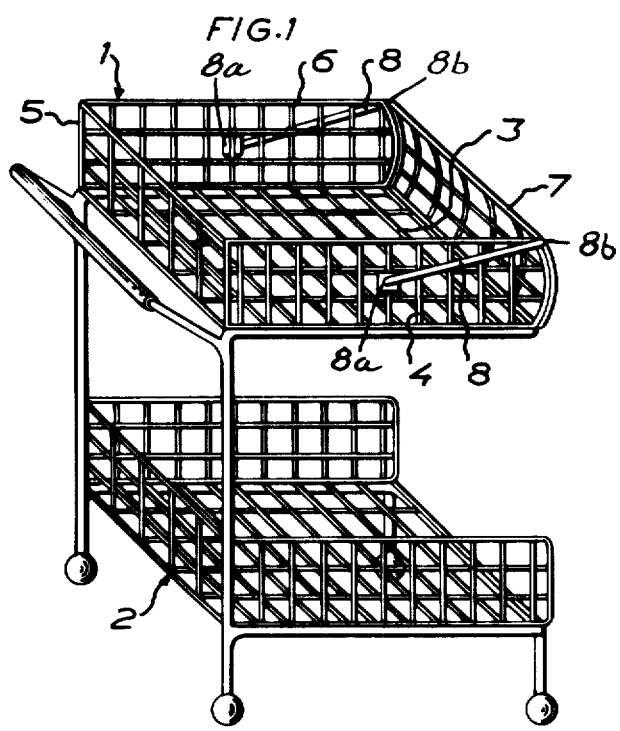

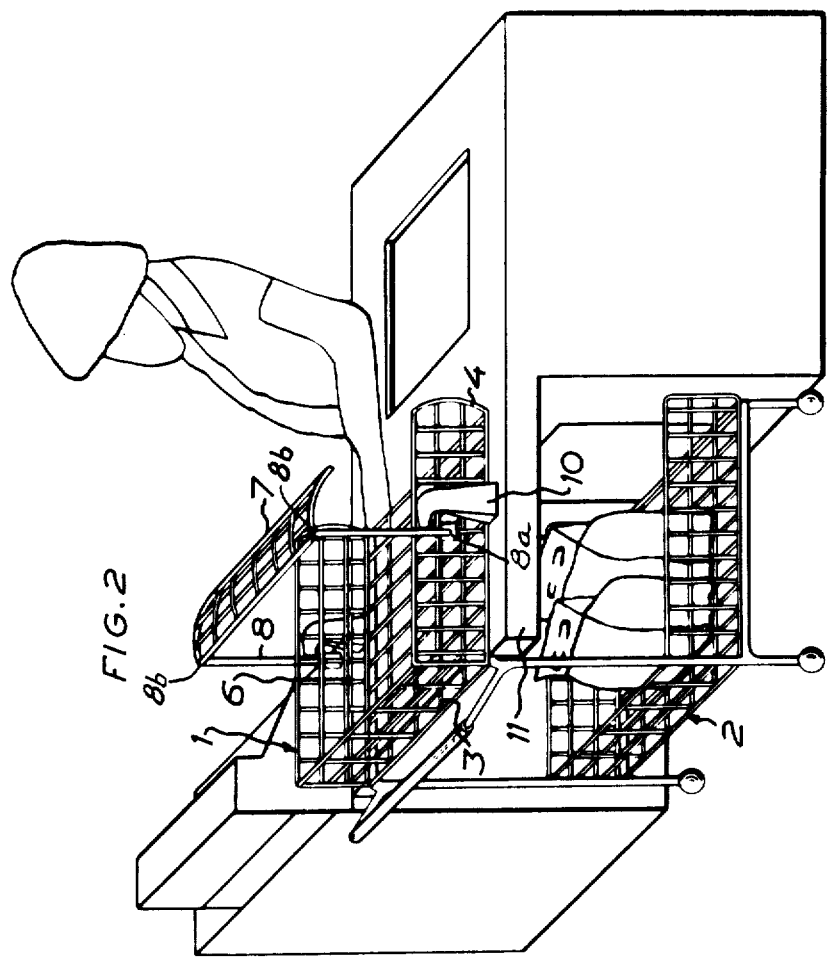

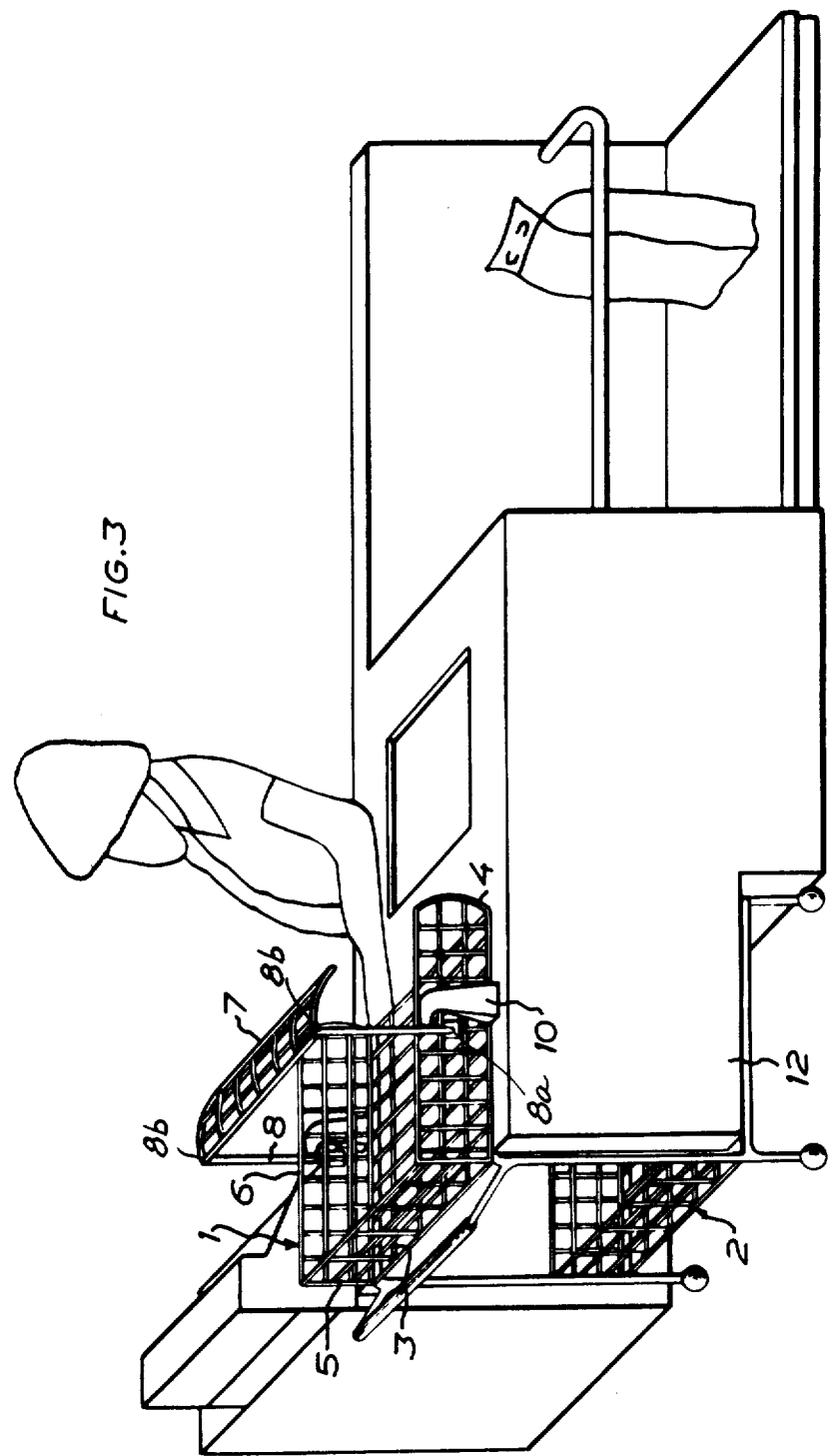

SYSTEM FOR HANDLING GOODS IN SELFSERVICE SHOPS

BACKGROUND OF THE INVENTION

The present invention relates to a system for handling goods in selfservice shops comprising a shopping trolley and a cash counter.

Various types of shopping trolleys are previously known. Some of them have a basket in which a side wall is adapted to pivot inwards to permit pushing several trolleys into each other when they are parked in a parking-place, said basket having its other side walls rigidly connected to each other. Such conventional shopping trolleys have the disadvantage that, to permit placing the goods on the counter, one must lift them over the side walls of the basket of the shopping trolley placed at the cash counter. This lifting operation is carried out either by the customer or by the cashier. In the former case, the goods, upon being taken out from the basket, are usually carried forward to the cashier by means of a conveyor arranged on the cash counter. Work studies have shown that the lifting work may cause injuries to the arms and to the spine, when it is carried out repeatedly every day.

SUMMARY OF THE INVENTION

The object of the present invention is to eliminate the lifting work mentioned above and to dispense with the need of a conveyor for delivering to the cashier the goods placed on the cash counter, so that the cashier can take out the goods directly from the basket without having to lift the goods over the side walls of the basket. To this end a system for handling goods in self-service shops, has been provided, comprising a shopping trolley and a cash counter, at least one basket, mounted on said trolley and consisting of a bottom and a plurality of side walls, mounting means for mounting one of said side walls of said basket for pivotal movement between a lowered closed position and a raised open position, means defining a compartment in said cash counter, corresponding to the size of said trolley and designed to receive said trolley, and control means, mounted on said cash counter for co-operation with said trolley to move said pivotable side wall from the lowered to the raised position as said trolley is introduced into said compartment.

BRIEF DESCRIPTION OF THE DRAWINGS

FIG. 1 shows a shopping trolley according to the invention having a pivoting side wall in lowered position; and FIGS. 2 and 3 show a trolley according to FIG. 1, completely introduced into the compatment of a cash counter according to the invention and having the pivoting side wall in raised position.

DESCRIPTION OF THE PREFERRED EMBODIMENT

The shopping trolley illustrated in FIG. 1 includes an upper basket 1 and a lower basket 2. The lower basket 2 consists of a bottom and three side walls which are so arranged that the basket has no side wall in the forward direction of the trolley. The upper basket 1 consists of a bottom 3 and four side walls 4, 5, 6, 7. One side wall 7 is pivotally connected to two opposite side walls 4, 6 and is adapted to pivot from a lowered closed position (FIG. 1) to a raised open position (FIGS. 2 and 3). The side wall 7, which is slightly curved, is pivotally connected at 8a to the two side walls 4, 6 by means of two levers 8 each of which is pivotally connected to respectively one of the two opposite side walls 4, 6 and rigidly connected at 8b to the pivoting side wall 7.

FIGS. 2 and 3 show cash counters each including a conventional packing machine for wrappings in which to carry articles home. The counter of FIG. 2 has an opening facing a trolley introduced into the compartment while the counter of FIG. 3 has an opening facing away from a trolley introduced into the compartment. The cash counters provide for the delivery of ready-packed wrappings emanating from the packing machine. The compartment is designed to receive the trolley and corresponds to the size of the trolley. The cash counter is also provided with control members 10 which co-operate with the trolley and include arms disposed on each side of the compartment, which are adapted to abut and turn the levers 8 and, consequently, entrain the pivoting side wall 7 from lowered to raised position as the trolley is introduced into the intended compartment in the cash counter. FIGS. 2 and 3 show an arm arranged respectively on a beam 11 and a wall 12 forming an outer boundary of the compartment.

In the embodiment illustrated in the drawings, the levers 8 are made of magnetic material and the arms consist of magnets, which results in that the arms, when the side wall 7 of the basket is in raised position, prevent the side wall 7 both from swinging down to the lowered position and from swinging over to the opposite side wall 5, and that the arms pull down the pivoting side wall 7 to lowered position as the trolley is being drawn out from the compartment.

The side wall 7 and the levers 8 can also be retained in raised position by suitable stopping means, and by suitable distribution of weight they may be caused to swing down to the lower position as the trolley is drawn out from the compartment.

What I claim and desire to secure by Letters Patent is:

1. A system for handling goods in selfservice shops, comprising a shopping trolley and a cash counter, at least one basket, mounted on said trolley and consisting of a bottom and a plurality of side walls, mounting means for mounting one of said side walls of said basket for pivotal movement between a lowered closed position and a raised open position, means defining a compartment in said cash counter, corresponding to the size of said trolley and designed to receive said trolley, and control means, mounted on said cash counter for co-operation with said trolley to move said pivotable side wall from the lowered to the raised position as said trolley is introduced into said compartment, said mounting means comprising two levers, means for pivotally mounting said levers each on respectively one of two side walls of said basket, being adjacent to said pivotable side wall, and means for rigidly connecting said levers to said pivotable side wall, and in which said control means include arms for abutting and turning said levers and consequently entraining said pivotable side wall from lowered to raised position as said trolley is introduced into the compartment in said cash counter.

2. A system as claimed in claim 1, in which said levers are made of magnetic material and said control means include magnets.

3. A system for handling goods in selfservice shops, comprising a shopping trolley and a cash counter, at least one basket, mounted on said trolley and consisting of a bottom and a plurality of side walls, two levers for mounting one of said side walls of said basket for pivotal movement between a lowered closed position and a raised open position, each lever being pivotally mounted on one of two side walls of said basket which are adjacent to said pivotable side wall, and rigidly connected to said pivotable side wall, means defining a compartment in said cash counter and receiving said trolley, and fixed control arms mounted on said cash counter for engaging and displacing said levers to move said pivotable side walls from the lowered to the raised position as said trolley is introduced into said compartment in said cash counter.

4. A system as claimed in claim 3, in which said levers are made of magnetic material and said control arms include magnets.

* * * * *